United States Patent
Haehnel et al.

(10) Patent No.: US 10,926,964 B2
(45) Date of Patent: *Feb. 23, 2021

(54) DEVICE AND METHOD FOR TRANSFERRING BLISTER PACKS

(71) Applicant: Uhlmann Pac-Systeme GmbH & Co. KG, Laupheim (DE)

(72) Inventors: Bernd Haehnel, Stutensee (DE); Andreas Armbruster, Saulgau (DE); Norbert Damaschke, Dettingen (DE); Tim Braeunig, Neu-Ulm (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,923

(22) Filed: Apr. 8, 2019

(65) Prior Publication Data
US 2019/0322471 A1    Oct. 24, 2019

(30) Foreign Application Priority Data

Apr. 23, 2018   (EP) .................................. 18168649

(51) Int. Cl.
*B65G 47/91*  (2006.01)
*B65B 35/18*  (2006.01)
*B65B 35/38*  (2006.01)
*B65B 35/50*  (2006.01)

(52) U.S. Cl.
CPC ............ *B65G 47/918* (2013.01); *B65B 35/18* (2013.01); *B65B 35/38* (2013.01); *B65B 35/50* (2013.01)

(58) Field of Classification Search
CPC ....... B65G 47/918; B65B 35/18; B65B 35/38; B65B 35/50
See application file for complete search history.

(56) References Cited

U.S. PATENT DOCUMENTS

2007/0251804 A1   11/2007  Hahnel et al.
2015/0056046 A1   2/2015   Haehnel et al.

FOREIGN PATENT DOCUMENTS

| DE | 10 2004 043332 A1 | 3/2006 |
| DE | 10 2006 047925 A1 | 4/2008 |
| EP |    2 840 030 A1   | 2/2015 |
| WO | WO 2014/181307 A1 | 11/2014 |

OTHER PUBLICATIONS

International Search Report for European Application No. 18168649. 4, dated Jul. 30, 2018, 5 pgs.

*Primary Examiner* — Ronald P Jarrett
(74) *Attorney, Agent, or Firm* — Dickinson Wright PLLC

(57) ABSTRACT

In the device and the method for transferring blister packs, two blister packs are first transferred from a stamping station to an intermediate place element and then from the intermediate place element to a single-file conveying means. The two blister packs are placed on the intermediate place element next to each other in a row on either side of a longitudinal center plane of the device. During the transfer from the intermediate storage element to the conveying means, both blister packs are picked from above from their intermediate place positions and also placed from above in the common final place position. When in the final place position, each blister pack has the same side facing up as in the corresponding intermediate place position but now with a rotation of 180° around its center. In addition, the blister packs acquire a lateral offset from the longitudinal center plane during the transfer.

14 Claims, 14 Drawing Sheets

DEVICE AND METHOD FOR TRANSFERRING BLISTER PACKS

RELATED APPLICATIONS

This application claims priority to European Patent Application No. 18 168 649.4, filed on Apr. 23, 2018, entitled "Device And Method For Transferring Blister Packs", the the contents of which are incorporated herein by reference in their entirety.

FIELD

The present disclosure relates to a device and a method for transferring blister packs from a at least one of stamping station, a transport means, and an intermediate storage area to a conveying means or a storage area.

BACKGROUND

Blister packs are frequently used in the pharmaceutical industry for the packaging of medications. A plurality of pockets, into which products such as sugar-coated pills or tablets are introduced, are first formed in a film web. After the pockets have been filled, the film web is sealed with a lidding foil and then sent to a stamping station, in which the individual blister packs are stamped out from the film web.

In another phase of the packaging process, the stamped-out blister packs are transferred to a conveying means by the use of a transfer device. The blister packs are placed in individual receptacles of the conveying means to form stacks. Then the stacks of blister packs arranged on the conveying means are sent to a packaging station, where the stacks of blister packs are introduced into appropriate packaging such as folding boxes. The time which the transfer device requires to transfer blister packs from the stamping station to the conveying means logically has an influence on the throughput of the overall packaging machine.

BRIEF SUMMARY

The present disclosure provides an improved device and a method for transferring blister packs from a stamping station, a transport means, or an intermediate storage area to a conveying means or a storage area, wherein the transfer of the blister packs proceeds with an especially high degree of efficiency, precision, and speed.

According to an aspect of the present disclosure, the device for transferring blister packs comprises a first transfer unit for transferring the blister packs from at least one of a stamping station, a transport means, and an intermediate storage area to an intermediate place element and a second transfer unit for transferring blister packs from the intermediate place element to a conveying means or a storage area. The second transfer unit comprises a first suction arm, which can be moved between a first picking position, in which a first blister pack can be picked from a first intermediate place position on the intermediate place element, and a first placing position, in which the first blister pack can be placed in a final place position on the conveying means or in the storage area. The second transfer unit also comprises a second suction arm, which can be moved between a second picking position, in which a second blister pack can be picked from a second intermediate place position on the intermediate place element, and a second placing position, in which the second blister pack can be placed in the same final place position. The first and second suction arms are arranged on either side of a longitudinal center plane of the device. Each suction arm comprises a first segment and a second segment, wherein the first segment of each suction arm is mounted so that it can rotate around an associated first axis, which is perpendicular to the longitudinal center plane. The first segment of each suction arm comprises a section to which the second segment is attached in such a way that it can rotate around a non-stationary second axis, which is substantially perpendicular to the first axis, wherein a suction device for drawing up and holding a blister pack is arranged on the second segment. The suction arms are configured and actuated in such a way that the movement of the suction arms from the first and second picking positions to the first and second placing positions and back is a combination movement, which consists at least of a first rotational movement of the first segment and of the second segment around the first axis and of a second rotational movement of the second segment around the second axis. The suction arms are configured and actuated in such a way that the blister packs are picked from above by the suction devices of the first and second suction arms from the first and second intermediate place positions and also placed from above in the final place position. The first and second intermediate place positions are each outwardly offset from the longitudinal center plane, and the final place position is arranged in the area of the longitudinal center plane. The second axis of the first suction arm is arranged in such a way that, during the first rotational movement of the first segment of the first suction arm, the second axis of the first suction arm moves in a first plane, which intersects the first intermediate place position or its lateral projection along a first straight line laterally offset from the center of the first intermediate place position. The second axis of the second suction arm is arranged in such a way that, during the first rotational movement of the first segment of the second suction arm, the second axis of the second suction arm moves in a second plane, which intersects the second intermediate place position or its lateral projection along a second straight line, which is laterally offset from the center of the second intermediate place position.

This guarantees a reliable transfer of the blister packs, during which the blister packs are transferred to a single-file conveying means or to a storage area in a simple manner with high throughput.

It is preferred that, in the first or second picking position, the second segment of the first or second suction arm is pivoted outward from the longitudinal center plane, and that, in the first or second placing position, the second segment of the first or second suction arm is pivoted inward from the longitudinal center plane. As a result of this structurally simple configuration, the blister packs can easily acquire their lateral offset during the transfer process.

In a preferred embodiment, the first and second suction arms are actuated in such a way that the first and second suction arms execute opposite back-and-forth pivoting movements. The throughput of the device can thus be increased.

It is advantageous for the second segments and thus for the blister packs held by the suction devices of the first and second suction arms to execute a rotational movement around the second axis of substantially 180° when the suction arms move from the first or second picking position to the first or second placing position or vice versa. This rotational movement ensures by simple means that the blister packs are rotated by 180° around their centers during the transfer. It is guaranteed in turn that the blister packs can be placed with their lidding foil side facing up.

The first segments preferably execute a rotational movement around the first axis of 120-180° when the suction arms move from the first or second picking position to the first or second placing position or vice versa. It is conceivable that the suction devices could each project at a slant from the second segment of the suction arms, so that the first segment must pivot around the first axis over an angle in a range of less than 180° and therefore over an angle which is less than that around which the blister packs must travel as they proceed from the intermediate place positions to the final place position.

So that the device can be adapted to various blister pack formats and so that the blister packs can be moved laterally to the desired extent during the transfer process, the suction arms can be supported so that they can be shifted in a direction parallel to the first axis.

The suction device of each suction arm preferably comprises at least one suction head, which is attached to the second segment by means of at least one support arm. It is especially preferable for the at least one support arm to be rigidly attached to the second segment.

To reduce the angular range to be covered by the first segment, the at least one support arm can project downward at a slant from the second segment in the first or second picking position and in the first or second placing position.

According to another aspect of the present disclosure, the method for transferring blister packs from a stamping station, a transport means, or an intermediate storage area to an intermediate place element and from the intermediate place element to a conveying means or a storage area by means of a device comprises the following steps:

transferring a first and a second blister pack from the stamping station, the transport means, or the intermediate storage area to the intermediate place element; wherein the blister packs are placed on the intermediate place element next to each other in a row in a first and a second intermediate place position on either side of a longitudinal center plane of the device;

picking a first blister pack from the first intermediate place position of the intermediate place element, moving the first blister pack, and placing the first blister pack in a final place position on the conveying means or in the storage area; wherein the first blister pack in the first intermediate place position is picked from above and also placed from above in the final place position on the conveying means or in the storage area; wherein the first blister pack, when in the first intermediate place position, is outwardly offset from the longitudinal center plane and is placed in the final place position in the area of the longitudinal center plane; and wherein, after the first blister pack has been placed in the final place position, it has the same side facing up as it did when in the first intermediate place position, but now after a rotation of 180° around its center; and picking a second blister pack from the second intermediate place position of the intermediate place element, moving the second blister pack, and placing the second blister pack in the final place position on the conveying means or in the storage area; wherein the second blister pack in the second intermediate place position is picked from above and also placed from above in the final place position on the conveying means or the storage area; wherein the second blister pack in the second intermediate place position is outwardly offset from the longitudinal center plane and is placed in the final place position in the area of the longitudinal center plane; and wherein, after the second blister pack has been placed in the final place position, it has the same facing up as it did when in the second intermediate place position, but now with a rotation of 180° around its center.

In this way, a reliable transfer of blister packs is guaranteed, in which the blister packs are transferred easily and with high throughput to a single-file conveying means or to a single-file storage area.

The picking of the first and second blister packs from the intermediate place element, the moving of the blister packs, and the placing of the blister packs on the conveying means or in the storage area are performed by suction arms, which execute opposing back-and-forth pivoting movements. In this way, the blister packs are treated gently and transferred with high throughput.

The transfer of the first and second blister packs from the stamping station, the transport means, or the intermediate storage area to the intermediate place area comprises, in a first alternative, the following steps:

picking the first blister pack from a first ready position of the stamping station, the transport means, or the intermediate storage area; moving the first blister pack; and placing the first blister pack in the first intermediate place position on the intermediate place element; wherein the first blister pack is placed from above in the first intermediate place position of the intermediate place element; and picking the second blister pack from a second ready position of the stamping station, transport means, or the intermediate storage area; moving the second blister pack; and placing the second blister pack in the second intermediate place position of the intermediate place element, wherein the second blister pack is placed from above in the second intermediate place position of the intermediate place element.

As a result of the double-file transfer to the intermediate place positions, the blister packs can be removed quickly from the stamping station, the transport means, or the intermediate storage area.

The first and second blister packs in the first and second ready positions are preferably arranged in a row on either side of the longitudinal center plane, and the first and second blister packs are placed in the first and second intermediate place positions after having been rotated by 180° in comparison to their orientation in the first and second ready positions. The transfer of the blister packs from the stamping station, the transport means, or the intermediate storage area to the intermediate place element thus proceeds quickly and with simple mechanical means.

Transferring the first and second blister packs from the stamping station, the transport means, or the intermediate storage area simultaneously to the intermediate place element promotes the high throughput of the device.

In a second alternative, the transfer of the first and second blister packs from the stamping station, the transport means, or the intermediate storage area to the intermediate place element comprises the following steps:

picking the first blister pack from a ready position of the stamping station, the transport means, or the intermediate storage area; moving the first blister pack; and placing the first blister pack in the first intermediate place position of the intermediate place element; wherein the first blister pack is placed from above in the first intermediate place position of the intermediate place element; wherein the first blister pack in the ready position is arranged in the area of the longitudinal center plane and is placed in the first intermediate place position with an outward offset from the longitudinal center plane; and wherein the first blister pack is placed in the first intermediate place position after a rotation of 180° around its center in comparison to its orientation in the ready position; and picking a second blister pack from the same ready position of the stamping station, the transport means, or the intermediate storage area; moving the second blister pack; and placing the second blister pack in the second intermediate place position of the intermediate place element; wherein the second blister pack is placed from above in the second intermediate place position of the intermediate place element; wherein the second blister pack in the ready position is arranged in the area of the longitudinal center plane and is placed in the second intermediate place position with an outward offset from the longitudinal center plane; and wherein the second blister pack is placed in the second intermediate place position after a rotation of 180° around its center relative to its orientation in the ready position.

For single-file stamping stations, transport means, or intermediate storage areas, this alternative offers the possibility of transferring blister packs to the intermediate place element as quickly and effectively as possible.

The transfer of the first and second blister packs from the stamping station, the transport means, or the intermediate storage area to the intermediate place element is preferably performed by suction arms, which execute opposing back-and-forth pivoting movements. In this way, the blister packs are treated gently and transferred with high throughput The first and second blister packs in the first and second intermediate place positions and in the final place positions are preferably arranged with their lidding foil facing up. It is also preferable for the first and second blister packs in the first and second ready positions or in the single common ready position to be arranged with the lidding foil facing up. This configuration is especially well adapted to the use of suction grips.

DETAILED DESCRIPTION

Figure 1:
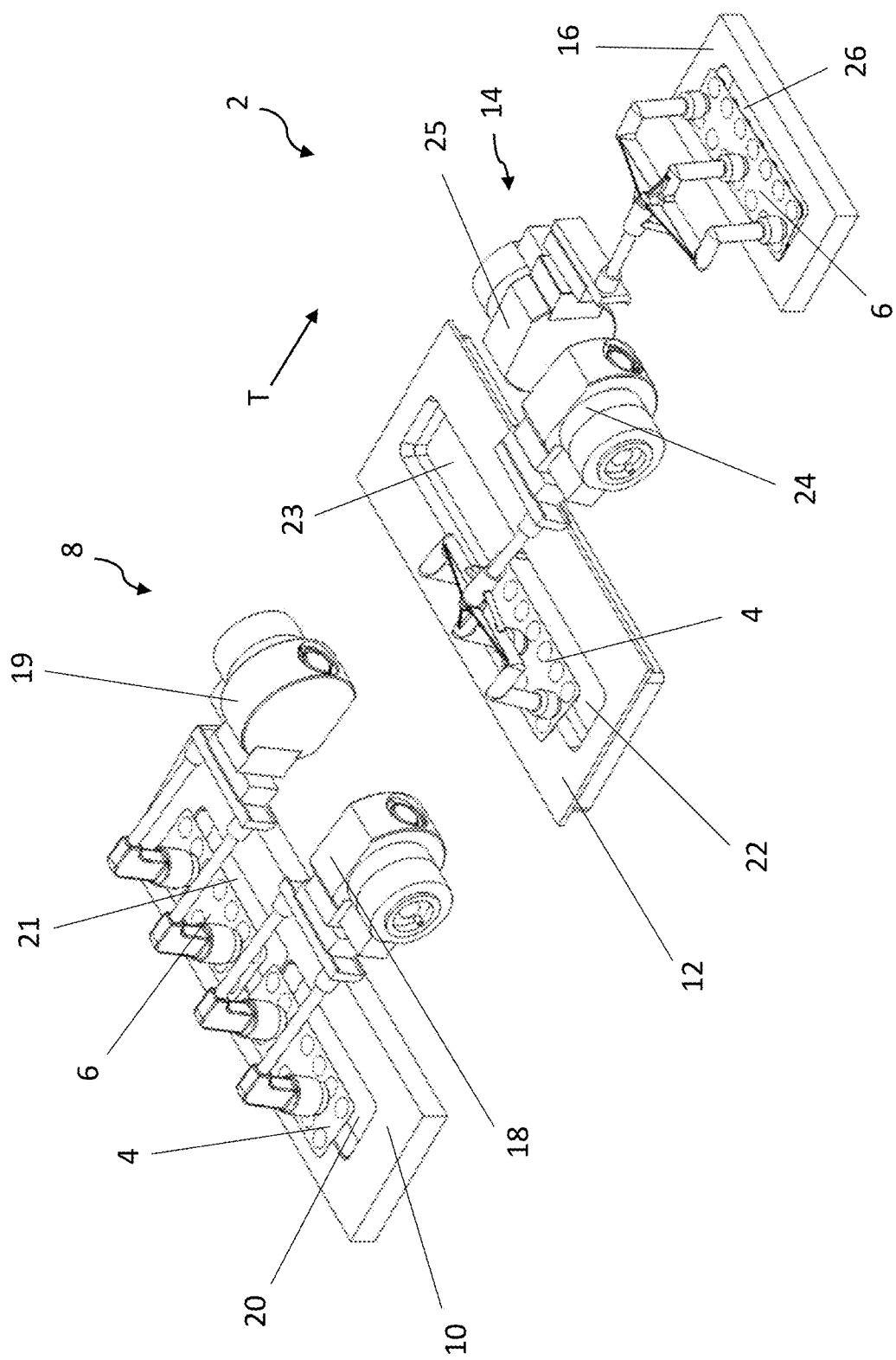
FIG. 1 is a schematic diagram, in perspective, of a device according to the present disclosure for transferring blister packs.
Figure 2:
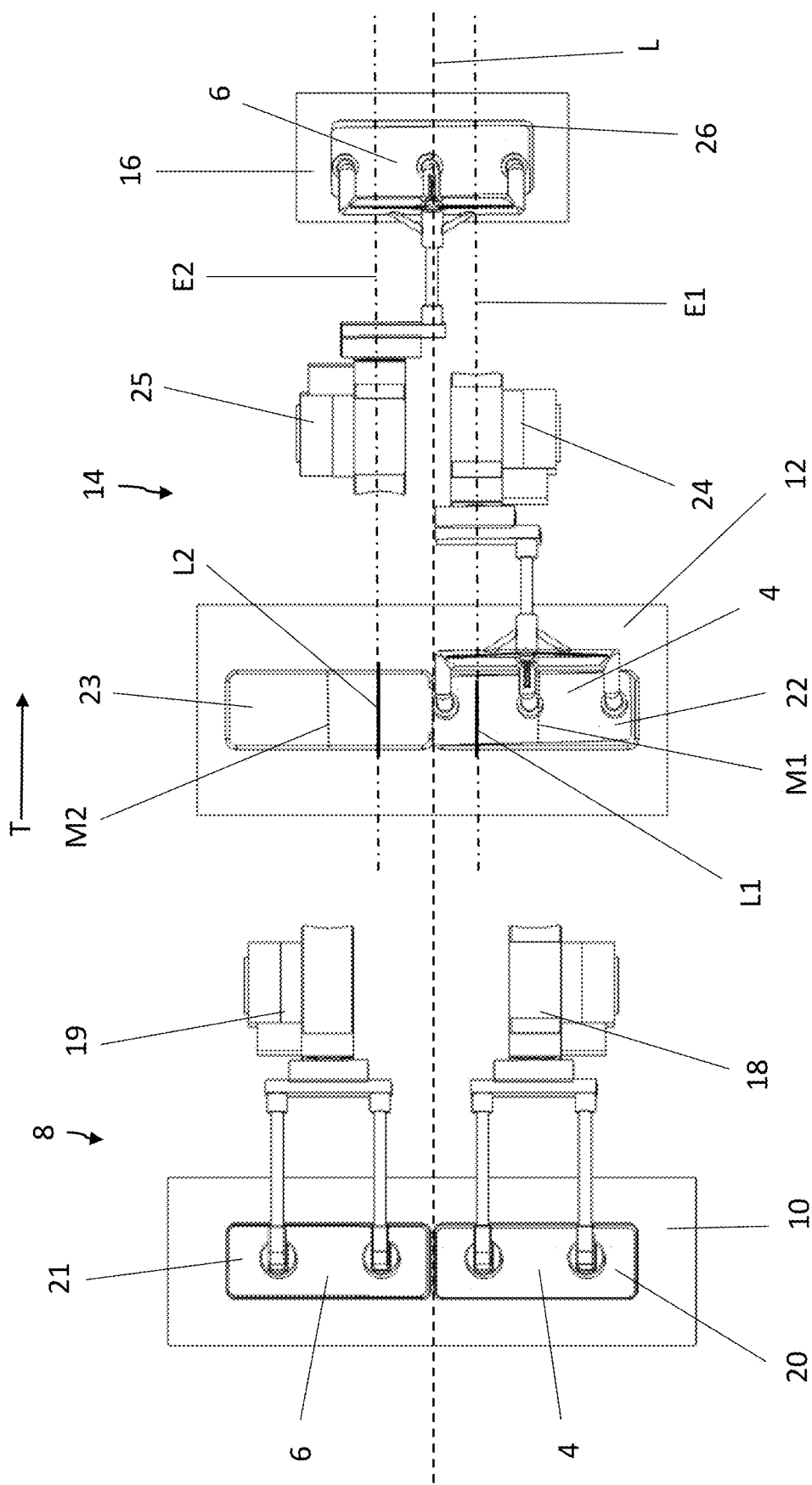
FIG. 2 is a top view of the device of FIG. 1.

FIGS. 1-6 show a device 2 according to the present disclosure for transferring blister packs 4, 6. The device 2 for transferring blister packs 4, 6 is seen in FIG. 1 and FIGS. 3-6 in various stages of the transfer process. FIG. 2 is a top view of the device 2.

The device 2 for transferring blister packs 4, 6 comprises a first transfer unit 8, which transfers the blister packs 4, 6 from a stamping station 10 to an intermediate place element 12, and a second transfer unit 14, which transfers the blister packs 4, 6 from the intermediate place element 12 to a conveying means 16. The transfer direction of the blister packs 4, 6 is indicated in the figures by the arrow T.

The stamping station 10, the intermediate place element 12, and the conveying means 16 are illustrated merely schematically in the figures. The blister packs 4, 6 are usually provided in the area of the stamping station 10 immediately after the stamping operation. It is also possible, however, that a transport means (not shown) could be provided in the output area of the stamping station 10; this transport means would then convey the blister packs 4, 6 onward after the stamping operation until they can be gripped by the first transfer unit 8. A transport means of this type preferably moves in stepwise fashion and in the transfer direction T. Finally, it is also possible that, after the stamping operation, the blister packs 4, 6 could be stored initially in an intermediate storage area (not shown), from which the transfer unit 8 would remove the individual blister packs 4, 6 situated above it or in front of it.

The conveying means 16 preferably moves in the transfer direction T. The conveying means 16 can be configured as an endless packaging-goods chain, which is moved continuously or preferably in stepwise fashion. It is also conceivable that the conveying means 16 could be configured as a linear motor system. If the conveying means 16 is moved in stepwise fashion or if, during the transfer, the individual slides of the endless linear motor system are standing still in the position where the blister packs 4, 6 are supplied to them, stacks of two or more blister packs 4, 6 lying on top of each other can be formed in the compartments of the conveying means 16. It is also conceivable that the blister packs 4, 6 could be transferred initially to a storage area (not shown) rather than directly to the conveying means 16.

The first transfer unit 8 comprises a first suction arm 18 and a second suction arm 19. The first suction arm 18 and the second suction arm 19 are arranged next to each other transversely to the transfer direction T (see FIG. 2) on either side of the longitudinal center plane L of the device 2 or of the transfer unit 8. The first suction arm 18 can be moved between a picking position, shown in FIG. 2, in which it can pick a first blister pack 4 from a first ready position 20 of the stamping station 10, and a placing position, in which it can place the first blister pack 4 in a first intermediate place position 22 of the intermediate place element 12.

Figure 4:
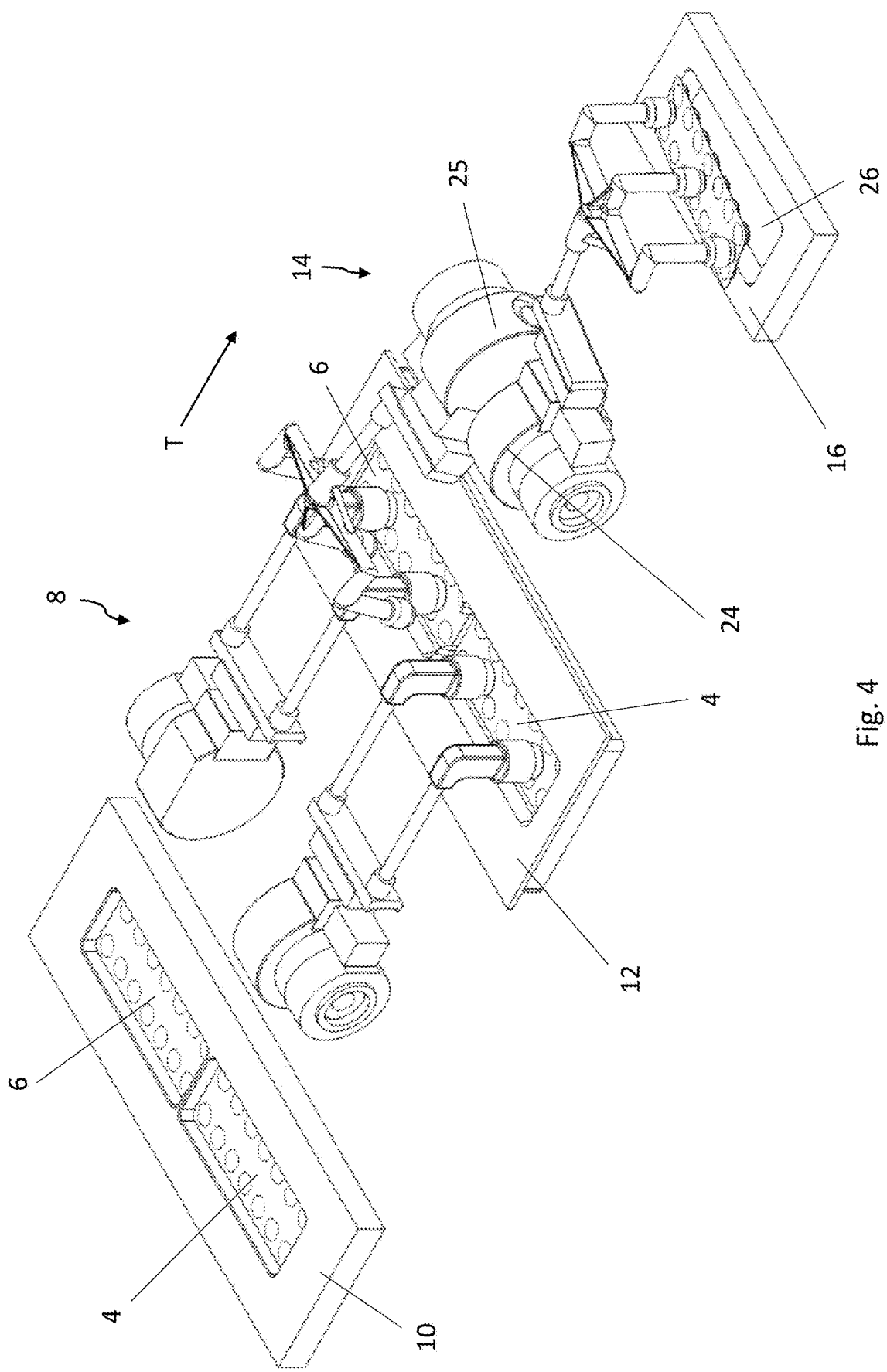

Similarly, the second suction arm 19 can be moved between a picking position, in which it can pick a second blister pack 6 from a second ready position 21 (see FIG. 2), and a placing position, in which it can place the second blister pack 6 in a second intermediate place position 23 of the intermediate place element 12. The placing positions of the first and second suction arms 18, 19 of the first transfer unit 8 are shown in FIG. 4.

In the preferred embodiment shown here, the suction arms 18, 19 are mirror-symmetric to the longitudinal center plane L and are actuated in such a way that they execute synchronous movements from the picking position to the placing position and back. In this way, the blister packs 4, 6 in the two ready positions 20, 21 of the stamping station 10 are gripped simultaneously by the first transfer unit 8 and also placed simultaneously in the two intermediate place positions 22, 23 of the intermediate place element 12. In addition to the embodiment illustrated here, there are also many other possible ways in which the first transfer unit 8 could be configured. For example, it is conceivable that the two blister packs 4, 6 could be transferred simultaneously by a single suction arm. Also conceivable is the use of gripping devices instead of the suction arms 18, 19. Finally, it is also possible that the two blister packs 4, 6 could be transferred successively, not simultaneously.

The second transfer unit 14 comprises a first suction arm 24 and a second suction arm 25, which are arranged next to each other in a row on either side of the longitudinal center plane L of the device 2 or of the transfer unit 14. The first suction arm 24 can be moved between a picking position (see FIG. 2), in which it can pick the first blister pack 4 from the first intermediate place position 22 of the intermediate place element 12, and a placing position (which is reached shortly after the position shown in FIG. 4), in which it can place the first blister pack 4 in a final place position 26 on the conveying means 16.

The second suction arm 25 of the second transfer unit 14 can be moved between a picking position (which is reached shortly after the position shown in FIG. 4), in which it can pick the second blister pack 6 from the second intermediate place position 23 of the intermediate place element 12, and a placing position (see FIG. 2), in which it can place the second blister pack 6 in the same final place position 26 as that in which the first suction arm 24 placed the first blister pack 4.

The two suction arms 24, 25 are preferably arranged and structured in mirror-symmetric fashion relative to the longitudinal center plane L of the device 2. The two suction arms 24, 25 execute opposing back-and-forth pivoting movements. When the first suction arm 24 is in the picking position, the second suction arm 25 is in its placing position or at least near its placing position. When the first suction arm 24 is in the placing position, the second suction arm 25 is in its picking position or at least near its picking position. The picking position of the first suction arm 24 differs in terms of its physical configuration in space from the picking position of the second suction arm 25. Similarly, the placing position of the first suction arm 24 differs from the placing position of the second suction arm 25 because of the mirror symmetry of the suction arms 24, 25 relative to the longitudinal center plane L.

The first and second ready positions 20, 21 of the stamping station 10, the first and second intermediate place positions 22, 23 of the intermediate place element 12, and the common final place position 26 on the conveying means 16 are each preferably configured to accommodate the shape of the blister packs 4, 6 to be transferred. In the case of conventional blister packs 4, 6, the cited positions will therefore have a substantially rectangular shape. In the embodiment shown, the above-cited positions are each arranged in such a way that their longer sides extend transversely to the transfer direction T. As can be seen in FIG. 2, the first and second ready positions 20, 21 are outwardly offset from the longitudinal center plane L of the device 2. The first and second intermediate place positions 22, 23 are also outwardly offset from the longitudinal center plane L, preferably in an arrangement relative to the longitudinal center plane L which is identical to the arrangement of the first and second ready positions 20, 21. The common final place position 26, however, is arranged in the area of the longitudinal center plane L. In the preferred embodiment shown here, the common final place position 26 is arranged symmetrically with respect to the longitudinal center plane L in such a way that the longitudinal center plane L intersects the final place position 26 in the middle.

The details of the second transfer unit 14 will now be described more completely with reference to FIGS. 7-10. As can be derived from FIG. 7, the first suction arm 24 comprises a first segment 30 and a second segment 31. The first segment 30 of the first suction arm 24 is mounted so that it can rotate around a first axis A1, which is perpendicular to the longitudinal center plane L. The first segment of the first suction arm 24 comprises a section to which the second segment 31 is attached in such a way that it can rotate around a non-stationary second axis A2, which is substantially perpendicular to the first axis A1. A suction device 34 for drawing up and holding the blister pack 4 is arranged on the second segment 31.

The second suction arm 25 also comprises a first segment 32 and a second segment 33. The first segment 32 of the second suction arm 25 is also mounted in such a way that that it can rotate around the same first axis A1. The first segment 32 of the second suction arm 25 also comprises a section to which the second segment 33 is attached in such a way that it can rotate around another non-stationary second axis A2' substantially perpendicular to the first axis A1. A suction device 34 for drawing up and holding a blister pack 6 is also arranged on the second segment 33.

The suction arms 24, 25 are configured and actuated in such a way that the movement of the suction arms 24, 25 from their associated picking positions to their associated placing positions and back is a combination movement, which consists at least of a first rotational movement of the first segment 30, 32 and of the second segment 31, 33 around the first axis A1 and a second rotational movement of the second segment 31, 33 around the associated second axis A2, A2'.

As can be derived from FIG. 2, the second axis A2 of the first suction arm 24 is arranged in such a way that, during the first rotational movement around the first axis A1, it moves in a first plane E1, which intersects the first intermediate place position 22 or its lateral projection along a first straight line L1. This first straight line L1 is laterally offset from the center M1 of the first intermediate place position 22. The lateral offset of this first straight line L1 begins from the center M1 of the first intermediate place position 22 and proceeds toward the longitudinal center plane L.

The second axis A2' of the second suction arm 25 is arranged in such a way that, during the first rotational movement of the second suction arm 25 around the first axis A1, it moves in a second plane E2, which intersects the second intermediate place position 23 or its lateral projection along a second straight line L2, which is laterally offset from the center M2 of the second intermediate place position 23. Here again, the lateral offset begins from the center M2 of the second intermediate place position 23 and proceeds toward the longitudinal center plane L.

Figure 7:
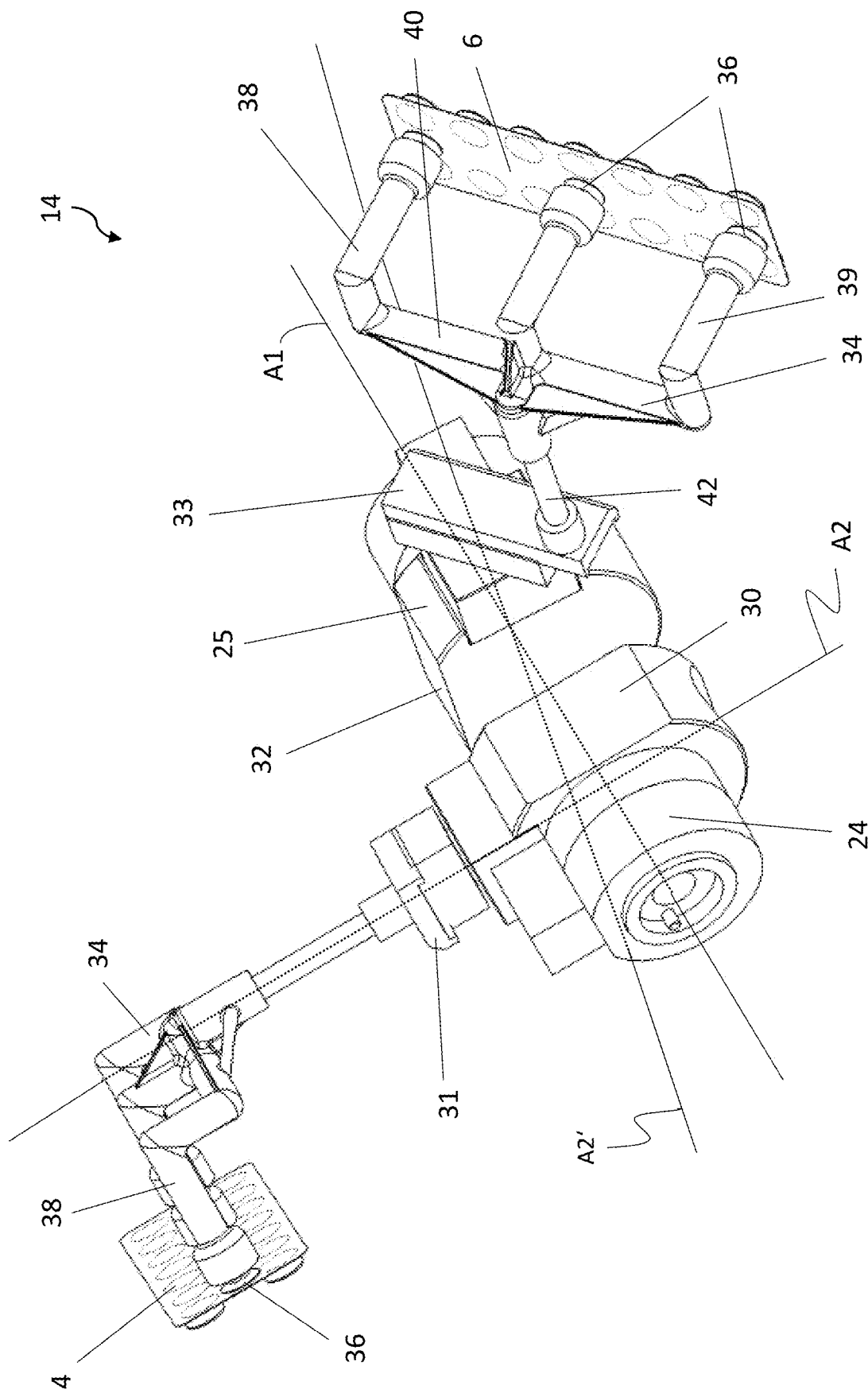
FIG. 7 is a schematic diagram, in perspective, of two suction arms used in the second transfer unit of the device according to FIG. 1.

As shown in FIG. 7, the suction device 34 of each suction arm 24, 25 comprises several suction heads 36, which are attached to the second segment 31, 33 by means of a support arm 38. It is also possible for only one suction head 36 to be present per suction device 34. If several suction heads 36 are present, several separate support arms 38 can be present to connect the suction heads to the second segment 31, 33. In the embodiment shown here, the support arm 38 is configured like a rake comprising several fingers 39, at the tip of each of which a suction head 36 is arranged. The support arm 38 is preferably attached rigidly to the second segment 31, 33. In the embodiment shown here, the fingers 39 of the support arm 38 project perpendicularly from a common connecting strut 40. The connecting strut 40 is connected in turn to the second segment 31, 33 by means of a connecting member 42, which is perpendicular to the strut. In the embodiment shown, the connecting member 42 of the support arm 38 is connected perpendicularly to the second segment 31, 33. It is also conceivable that the connecting member 42 and thus the support arm 38 could project at a slant from the second segment 31, 33. The connecting member 42 and thus the support arm 38 would then both project downward at a slant in the associated picking and placing positions of the suction arms 24, 25. In this way, the angle which the associated suction arm 24, 25 must travel around the first axis A1 can be reduced.

As can be seen from FIGS. 2 and 7, the second segment 31, 33 of the first or second suction arm 24, 25 in the associated picking position is pivoted outward relative to the longitudinal center plane L. In concrete terms, the section of the second segment 31, 33 to which the support arm 38 is attached is pivoted outward. It can also be seen that the second segment 31, 33 of the first or second suction arm 24, 25—in concrete terms, the section of the second segment 31, 33 to which the support arm 38 is attached—is, when in the associated placing position, pivoted inward relative to the longitudinal center plane L.

Details of a possible drive for the suction arm 24 will now be described with reference to FIGS. 8-10.

Figure 8:
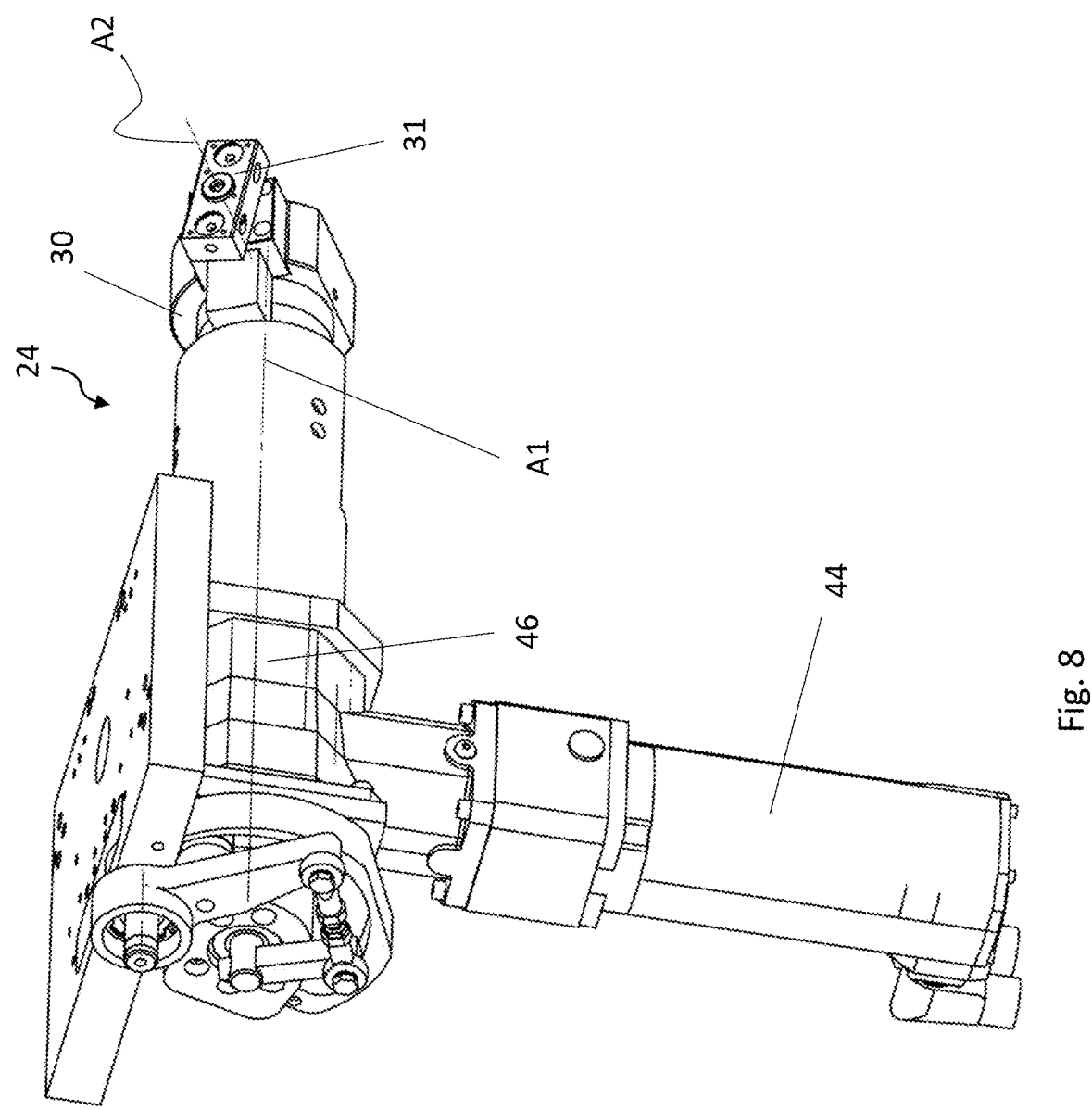
FIG. 8 is a schematic diagram, in perspective, of essential drive components of a section of FIG. 7.

In FIG. 8 a motor 44 can be seen, which pivots the first segment 30 back and forth around the first axis A1 by way of a gear unit 46. The second segment, which can pivot around the second axis A2, is illustrated without the suction device 34 which would normally be attached to it. The suction device 34 is preferably a format-dependent component, which can be replaced depending on the type and size of the blister packs 4, 6 to be transferred. So that the support arm 38 of the suction device 34 can be attached to, and detached from, the second segment, a knurled screw 48 is preferably provided (see FIG. 9). To allow for additional adaptations to different formats, the suction arms 24, 25 can also be supported so that they can shift in a direction parallel to the first axis A1 and/or shift in the longitudinal direction.

Figure 9:
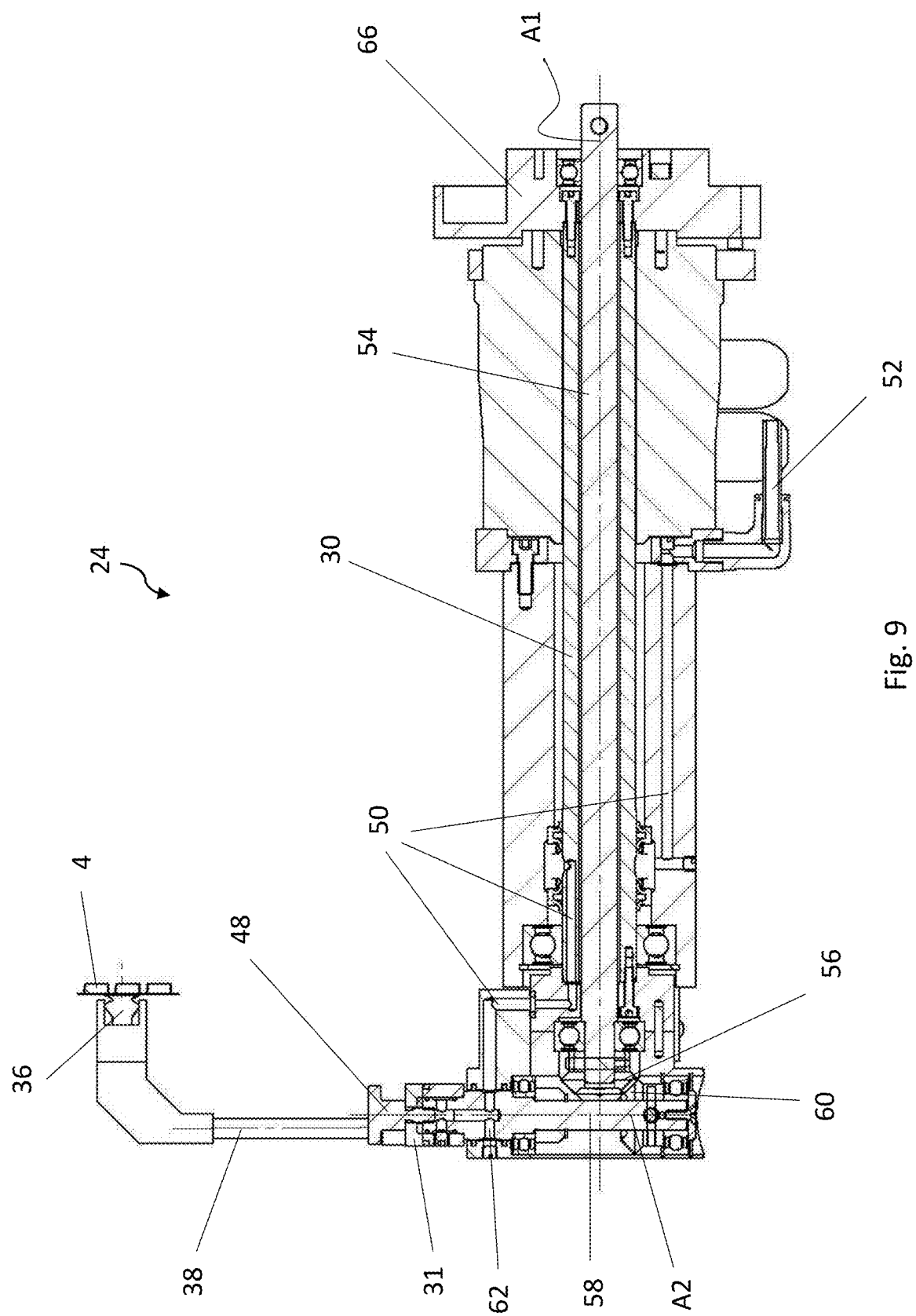
FIG. 9 is a cross-sectional view illustrating the internal structure of a suction arm according to FIG. 7.
Figure 10:
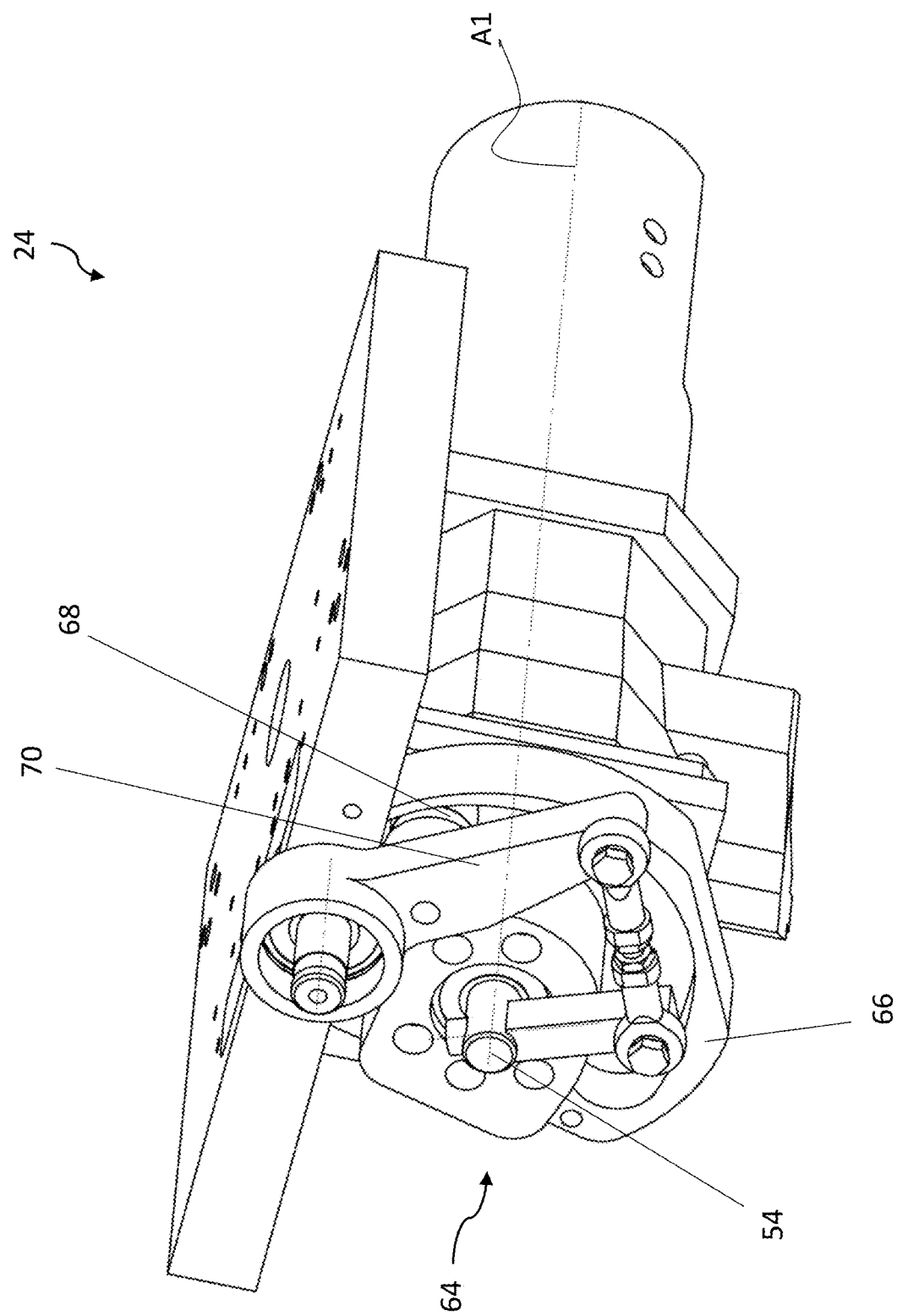
FIG. 10 is a schematic diagram, in perspective, of a mechanism for adapting the rotational movement of the second segment of the suction arm of FIG. 9 around the second axis.

In the cross-sectional view of FIG. 9, the motor 44 and the gear unit 46 are not shown. The motor 44 drives the first segment 30 of the suction arm 24, which is configured as a hollow shaft. When the motor 44 is actuated, the first segment 30 is pivoted back and forth around the first axis A1. The second segment 31 is supported in a section of the first segment 30 so that it can rotate around the second axis A2. In the first segment 30, air channels 50 are present, which are connected to a vacuum connector 52 for the suction heads 36. In the interior of the first segment 30, there is also a shaft 54, to one end of which, namely, the end facing the second segment 31, a bevel gear 56 is rigidly attached.

The second segment 31 comprises a central shaft 58, which is rotatably supported in the end section of the first segment 30 and which moves along with the first segment 30 when the first segment turns around the first axis A1. Rigidly attached to the shaft 58 is a bevel gear 60, which meshes with the bevel gear 56 when the first and second segments 30, 31 rotate around the first axis A1. An annular groove 62 in the shaft 58 serves to produce a connection with the air channels 50 in the first segment 30 even when the second segment 31 is rotating around the second axis A2.

When the first segment 30 and thus also the second segment 31 are now pivoted around the first axis A1, the bevel gear 60 travels over the nonmoving bevel gear 56 and thus causes the shaft 58 to rotate in a certain direction around the second axis A2. At a gear ratio of 1:1 between the bevel gears 56, 60, therefore, a pivoting of the first segment 30 and of the second segment 31 around the first axis A1 by 180°, as is desired in the case of the transfer processes illustrated in FIGS. 1-6, also brings about a rotation of the second segment 31 around the second axis A2 by 180°. Thus the second segment 31 and the blister pack 4 held by the suction device 34 execute a rotational movement around the second axis A2 of substantially 180° when the suction arm 24 moves from its picking position to its placing position or vice versa. If the suction device 34 projects downward at a slant when in the picking position and in the placing position, the first segment 30 can also travel around angular range of less than 180°, possibly as little as 120°, when it executes the pivoting movement around the first axis A1. In this case, the ratio between the bevel gears 56, 60 would have to be adapted accordingly, because the second segment 31 must in any case complete a rotational movement of 180° around the second axis A2.

The rotational movement of the second segment 31 around the second axis A2 in combination with the pivoting movement around the first axis A1 produces the effect that one side of the associated blister pack 4, preferably the flat surface of the lidding foil side, can be gripped by the suction head 36 and then placed from above in the final place position 26. As this is happening, the blister pack 4 is rotated by 180° around its center.

In a departure from the basic principle explained so far, it is desirable for the second segment 31 not to execute any rotational movement around the second axis A2 in the final phases of the pivoting movement around the first axis A1. The reason for this is that, for an effective picking and placing of the blister packs 4, it is advantageous for the blister packs 4 to be raised and lowered in a straight line in the final phases of their movements. To achieve this goal, a mechanism 64 for adapting the course of the rotation of the second segment 31 around the second axis A2 can be provided in the second transfer unit 14.

This mechanism 64 will now be described in greater detail with reference to FIG. 10. In FIG. 10, the end of the first segment 30 to which the second segment 31 and the suction device 34 are attached is not shown for the sake of clarity. The mechanism 64 comprises a cam disk 66, which rotates jointly with the first segment 30 around the first axis A1. The cross-sectional view in FIG. 9 also shows this cam disk 66 but without the additional components of the mechanism 64.

Again with reference to FIG. 10, the mechanism 64 also comprises a cam roller 68, which is articulated rotatably to a lever mechanism 70. The lever mechanism 70 is rigidly connected in turn to the internal shaft 54, to the other end of which the bevel gear 68 is attached. When the cam disk 66 rotates around the first axis A1, the cam roller 68 runs along the cam disk 66 and thus brings about a corresponding deflection of the lever mechanism 70, which leads in turn to a rotation of the shaft 54 around the first axis A1. The mechanism 64 is configured in such a way that, during the initial and final phases of the rotational movement of the first segment 30 and thus of the cam disk 66 around the first axis A1, the shaft 54 and thus the bevel gear 56 move along at the same angular velocity as the first segment 30. As a result, there is no relative movement between the bevel gear 56 and the bevel gear 60, which also means that there is no rotational movement of the second segment 31 around the second axis A2.

Over the further course of the pivoting movement around the first axis A1, however, the mechanism 64 brings about an opposing movement of the shaft 54 opposite to the rotational direction of the first segment 30, as a result of which the rotational speed of the second segment 31 around the second axis A2 is faster, over a certain area, than the rotational movement around the first axis A1. It is thus possible, at the end points of the pivoting movement around the first axis A1, to suspend the rotational movement of the second segment 31 around the second axis A2 and to compensate for this again in a middle phase of the pivoting movement around the first axis A1 by the more rapid rotation of the second segment 31 around the second axis A2. This guarantees that the blister packs 4 will always complete a rotational movement of 180° around the second axis A2.

There are obviously many different modifications which can be made to the structure of the suction arms 24 and to the associated drive described so far. Thus, for example, the coupling between the pivoting movement of the first segment 30 around the first axis A1 and the rotational movement of the second segment 31 around the second axis A2 can also be accomplished by other mechanical components. In addition, it is conceivable that two separate servo motors could be provided, one for the drive of the first segment 30 and one for the drive of the second segment 31.

The structure of the suction arm 25 is mirror-symmetric to that of the suction arm 24, wherein the first segment carries the designation 32, the second segment the designation 33, and the second axis the designation A2'.

The sequence of steps of the transfer process with the above-described device 2 will now be explained in greater detail with reference to FIGS. 1-6. The blister packs 4, 6 are picked simultaneously from the two ready positions 20, 21 in the stamping station 10 by the first and second suction arms 18, 19 of the first transfer unit 8, moved to the first and second intermediate place positions 22, 23, and placed there. The blister packs 4, 6 are preferably picked from above by the first transfer unit 8 in the ready positions 20, 21 and also placed from above in the intermediate place positions 22, 23 of the intermediate place element 12.

Because of the combined rotational movements around the two axes, which are perpendicular to each other, the blister packs 4, 6, which are arranged in the ready positions 20, 21 in a row on either side of the longitudinal center plane L, are placed in the intermediate place positions 22, 23 with the same side facing up as they did when in the ready positions 20, 21 but now with a rotation of 180° around their centers. If desired, it is also possible that the blister packs 4, 6 in the ready positions 20, 21 could be oriented vertically or at an angle to the vertical instead of horizontally. In this case, the suction arms 18, 19 would only have to pivot around the first axis by an angle of less than 180°, usually by an angle in the range of 60-180°.

Figure 3:
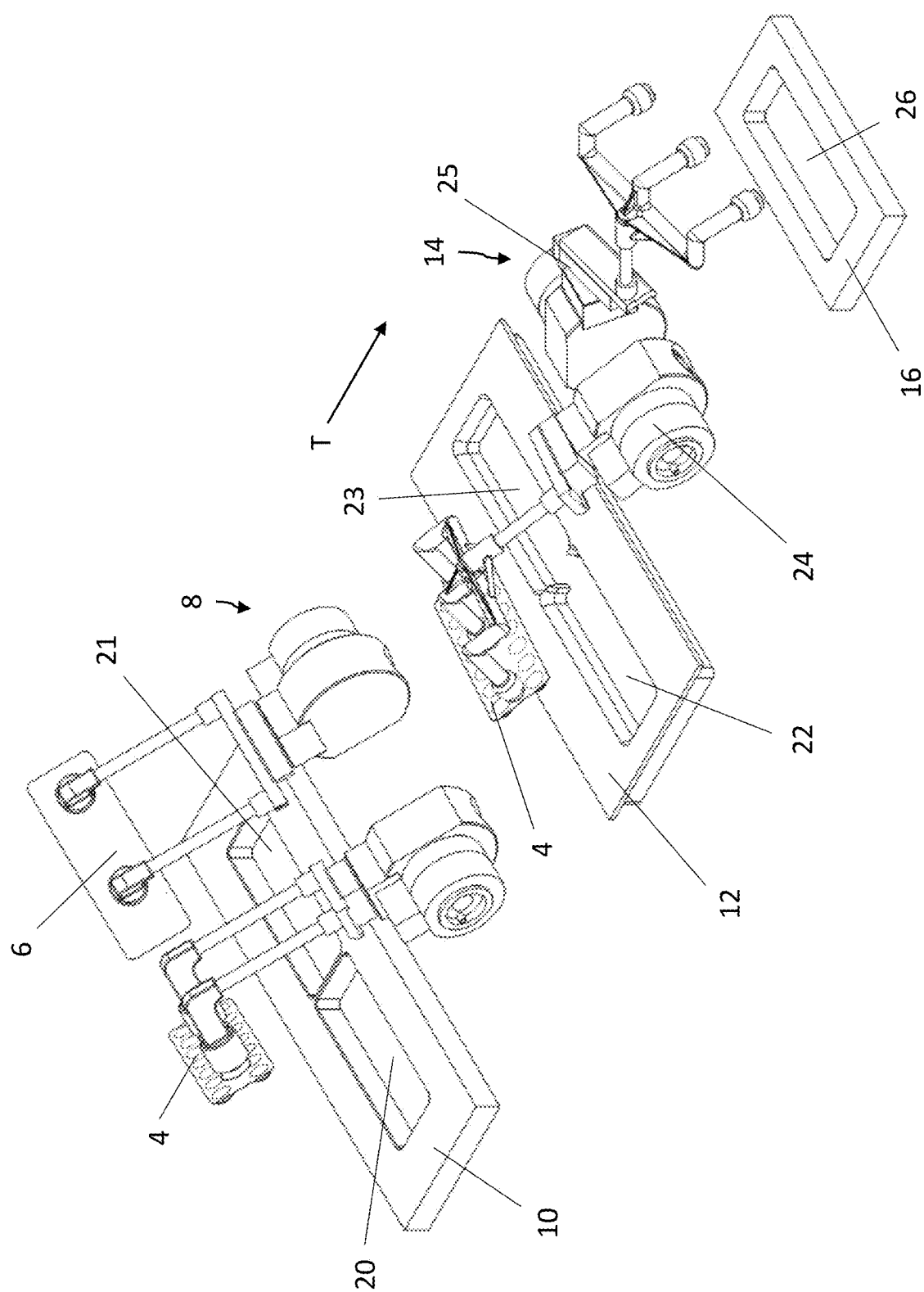
FIGS. 3-6 are schematic diagrams, in perspective, of the device of FIG. 1, representing various stages of the transfer process.
Figure 5:
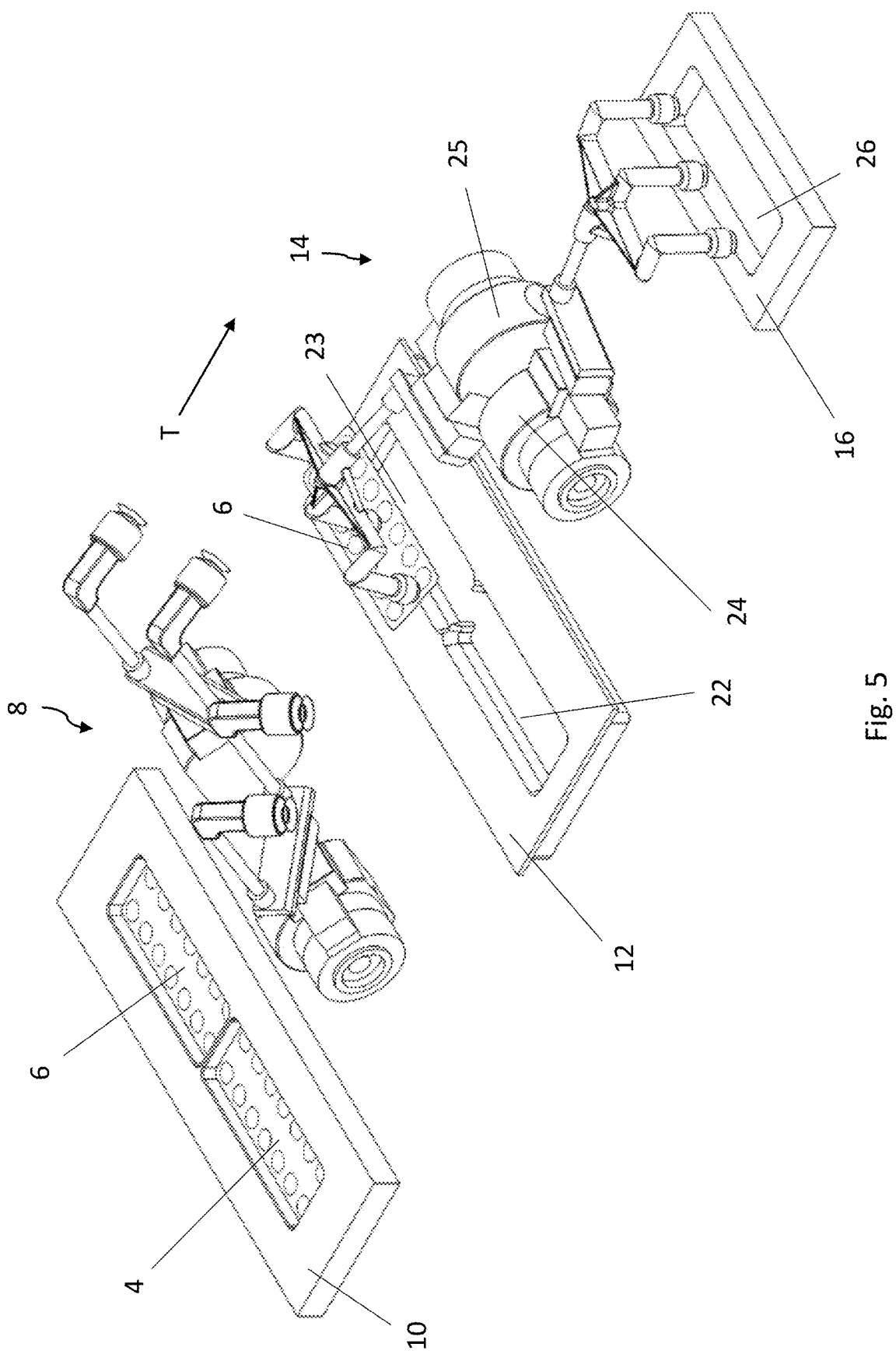
Figure 6:
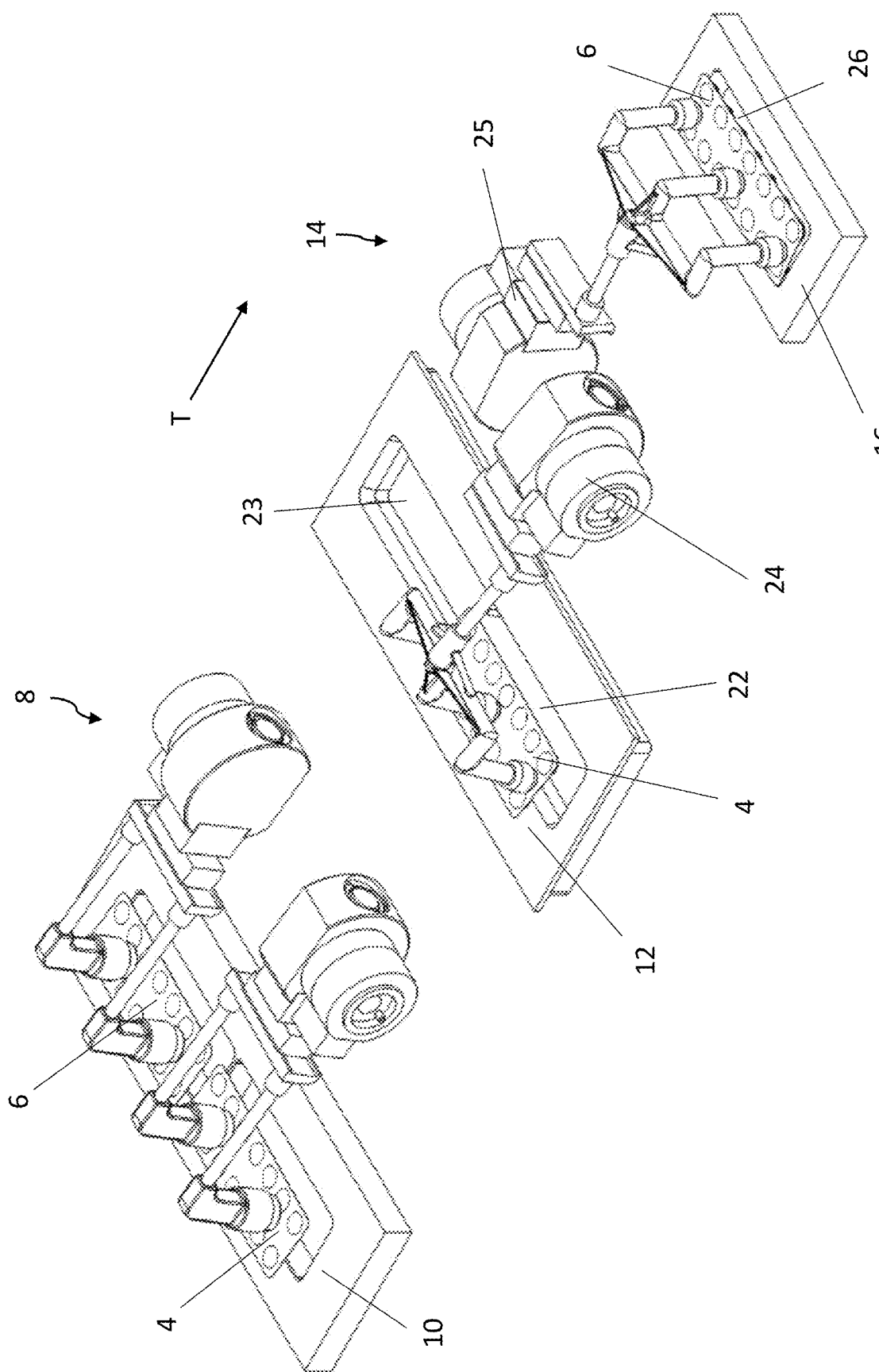

FIG. 1 shows the blister packs 4, 6 immediately after they have left the ready positions 20, 21. In FIG. 3, the blister packs 4, 6 are on their way from the ready positions 20, 21 to the intermediate place positions 22, 23, where they are placed as shown in FIG. 4. In FIG. 5, the suction arms 18, 19 are on the way back to their picking positions, and in FIG. 6 the transfer cycle begins again from the beginning.

As previously explained, it is possible to use a single suction arm instead of the two suction arms 18, 19 moving in the same direction to transfer the two blister packs 4, 6 from the stamping station 10 to the intermediate place element 12. According to another possibility, the blister packs 4, 6 are not transferred simultaneously by the first transfer unit 8 but rather are transferred by movements of the suction arms 18, 19 in opposite directions.

As soon as the blister packs 4, 6 have been provided in the intermediate place positions 22, 23, the first blister pack 4 can be gripped there by the first suction arm 24 of the second transfer unit 14 and transferred to the final place position 26. The first blister pack 4, now in the first intermediate place position 22, is picked from above and also placed from above in the final place position 26 on the conveying means 16. When in the first intermediate place position 22, the first blister pack 4 is outwardly offset from the longitudinal center plane L, and, when in the final place position 26, it is located in the area of the longitudinal center plane L. After the blister pack 4 has been placed in the final place position 26, it has the same side facing up as it did when in the first intermediate place position 22, but now with a rotation of 180° around its center. FIG. 1 shows the first blister pack 4 shortly after it has been gripped at the first intermediate place position 22. In FIG. 3, the first blister pack 4 is on its way from the first intermediate place position 22 to the final place position 26, where it is placed shortly after the time shown in FIG. 4. In FIG. 5, the first suction arm 24 is shown shortly after having placed the blister pack and has already begun its return journey to the picking position. In FIG. 6, the cycle begins again from the beginning. The process is repeated as often as desired.

For the transfer of the second blister pack 6 from the second intermediate place position 23 to the common final place position 26 by means of the second suction arm 25, what was said concerning the transfer of the first blister pack 4 by means of the first suction arm 24 applies exactly to this transfer as well. The only difference is that the times at which the blister pack 6 is picked and at which the blister pack 6 is placed are substantially the opposite of those at which the first blister pack 4 is picked and placed. The two suction arms 24, 25 complete a pivoting movement around the same first axis A1, whereas the rotational movements of their second segments 31, 33 around the associated second axis A2, A2' proceed in opposite directions. At the vertex of the rotational movement, as shown in the cross section of FIG. 9, the blister packs are preferably parallel to the longitudinal center plane L.

The times at which the blister packs 4, 6 are picked from the intermediate place positions 22, 23 must be coordinated with the times at which the blister packs 4, 6 are placed on the intermediate place positions 22, 23 by the first transfer unit 8. To increase the throughput, it can be effective for the suction arm 24, 25 of the second transfer unit 14 to be picking the blister pack 4, 6 at the associated intermediate place position 22, 23 while the suction arm 18, 19 of the first transfer unit 8 is still in the area of the associated intermediate place position 22, 23. In a case such as this, it is necessary for the suction arms 18, 19, 24, 25 to have a geometry which results in an offset of the suction devices 34 of the suction arms 18, 19, 24, 25 from each other in the area of the intermediate place positions 22, 23 (see FIG. 4).

The structure and drive of the suction arms 18, 19 of the first transfer unit 8 are preferably substantially identical to the structure and drive of the suction arms 24, 25 of the second transfer unit 14, as has been described in detail above. The only difference is that the planes in which the second axes of the suction arms 18, 19 move intersect the ready positions 20, 21 and the intermediate place positions 22, 23 along straight lines which are centered on the ready positions 20, 21 and the intermediate place positions 22, 23. As a result, the blister packs 4, 6 experience no lateral offset during transfer.

FIGS. 11-14 show an alternative configuration of the first transfer unit, here designated 108. In comparison to the previously described configuration of the first transfer unit, the blister packs 4, 6 in this configuration are provided in a common ready position 28 in the stamping station and are placed with a lateral offset in the intermediate place positions 122, 123.

This configuration of the first transfer unit 108 comprises a first suction arm 118 and a second suction arm 119, which are arranged in a row, one next to the other, on either side of the longitudinal center plane L of the device 2 or of the transfer unit 108. The first suction arm 118 can be moved between a picking position (see FIGS. 12 and 13), where it picks the first blister pack 4 from the common ready position 28, and a placing position (which is reached shortly after the position shown in FIG. 11), where it places the first blister pack 4 in a first intermediate place position 122 of the intermediate place element 112.

The second suction arm 119 can be moved between a picking position (see FIG. 11), where it picks the second blister pack 6 from the ready position 28, and a placing position (which is reached shortly after the position shown in FIG. 13), where it places the second blister pack 6 in a second intermediate place position 123.

The two suction arms 118, 119 are preferably arranged and structured with mirror-symmetry to the longitudinal center plane L of the device 2 or of the transfer unit 108. The two suction arms 118, 119 execute opposite back-and-forth pivoting movements. When the first suction arm 118 is in the picking position, the second suction arm 119 is in its placing position or at least near its placing position. When the first suction arm 118 is in the placing position, the second suction arm 119 is in its picking position or at least near its picking position. The placing position of the first suction arm 118 differs in terms of its physical configuration in space from the placing position of the second suction arm 119. The picking position of the first suction arm 118 also differs from the picking position of the second suction arm 119 because of the mirror symmetry of the suction arms 118, 119 to the longitudinal center plane L.

Figure 12:
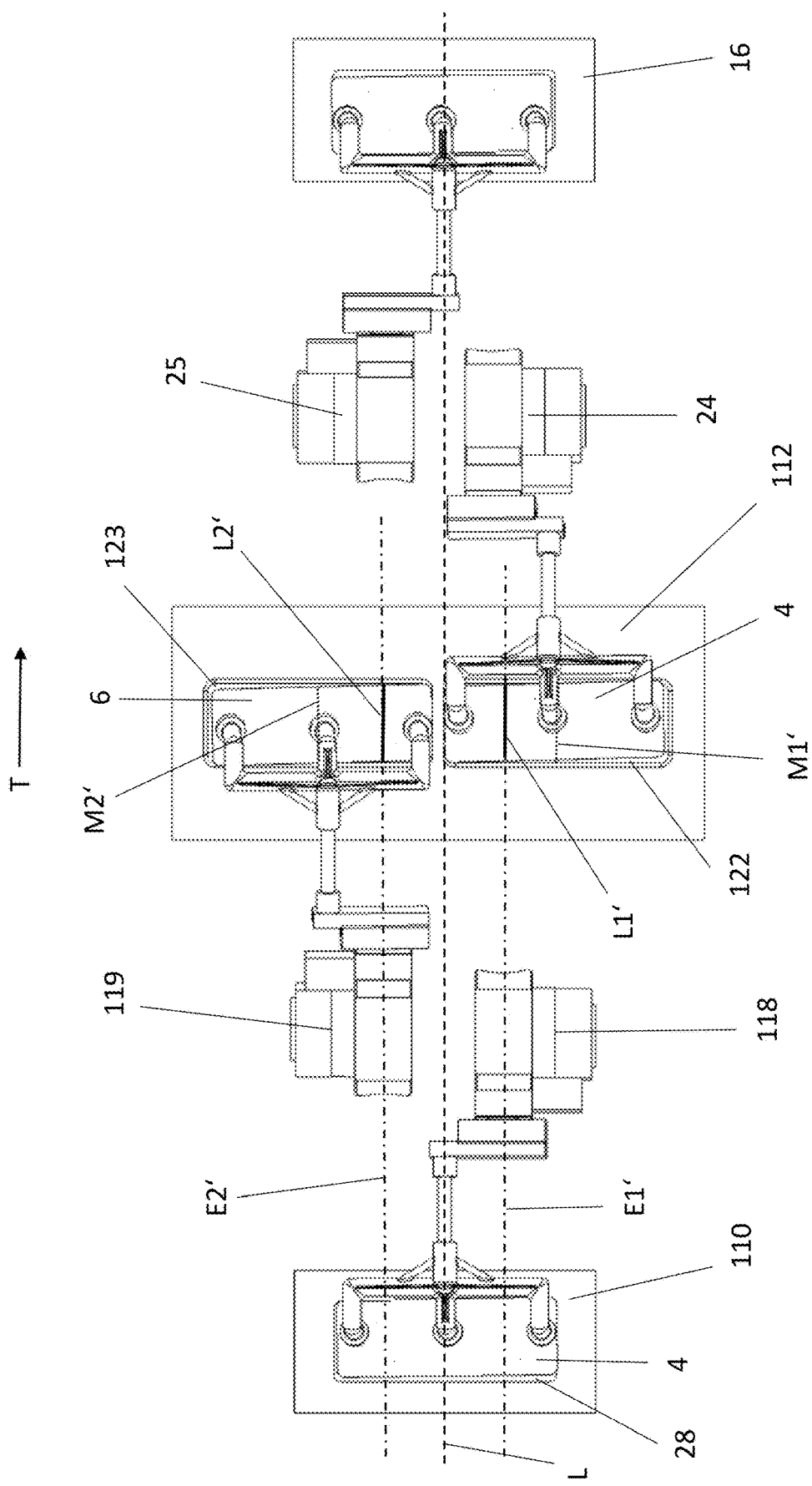
FIG. 12 is a top view of a modification of the device according to the present disclosure shown in FIG. 1, wherein the transfer unit of FIG. 11 is used as the first transfer unit.

The first and second intermediate place positions 122, 123 of the intermediate place element 112 correspond with respect to their shape and arrangement to the intermediate place positions 22, 23 of the previously described embodiment. As can be seen in FIG. 12, the first and second intermediate place positions 122, 123 are outwardly offset from the longitudinal center plane L. The common ready position 28, however, is arranged in the area of the longitudinal center plane L. In the preferred embodiment shown here, the common ready position 28 is symmetric to the longitudinal center plane L in such a way that the longitudinal center plane L intersects the center of the ready position 28.

Figure 14:
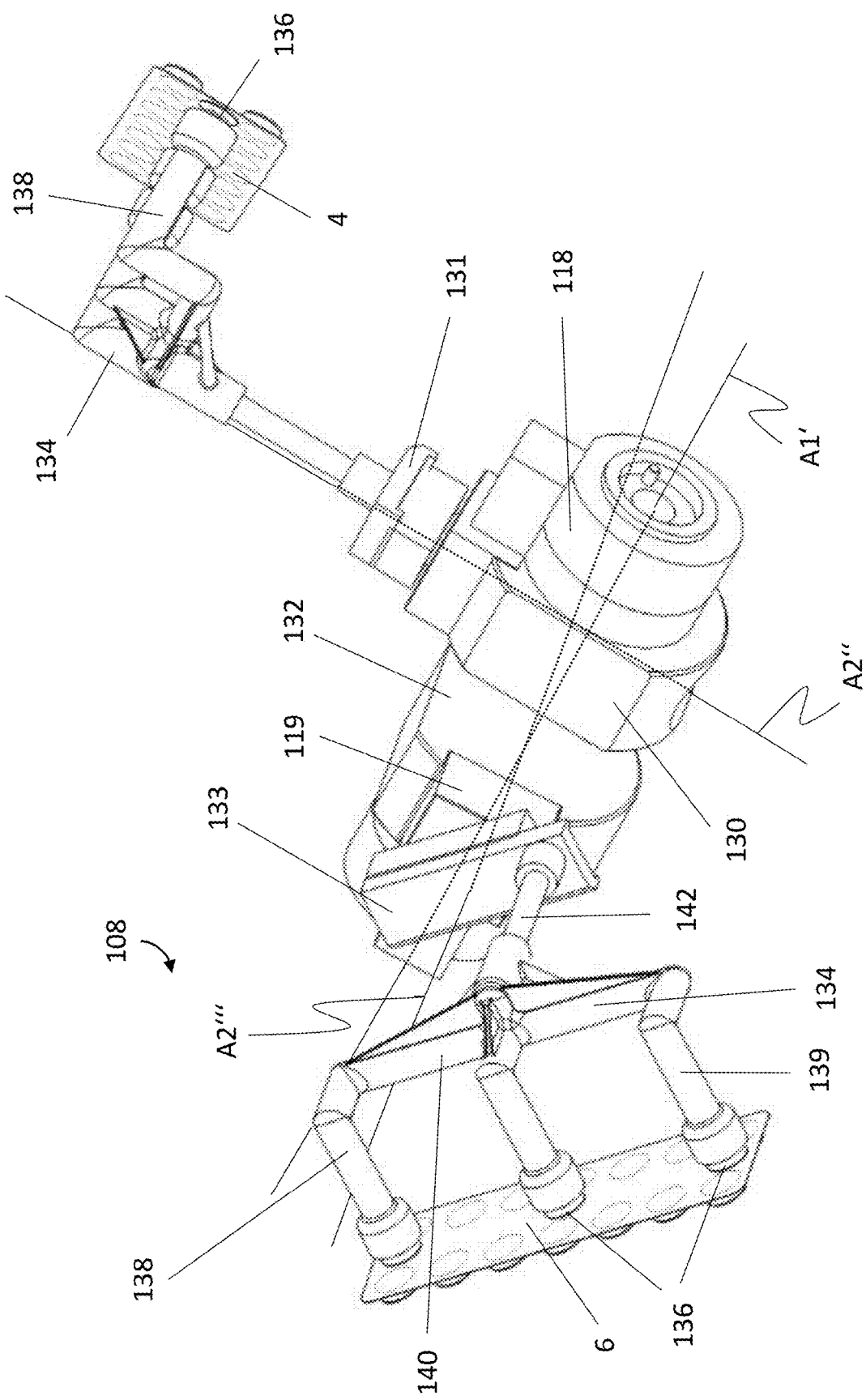
FIG. 14 is a schematic diagram, in perspective, of the suction arms of the transfer unit of FIG. 11.

The details of the transfer unit 108 will now be described in greater detail with reference to FIG. 14. As can be seen in FIG. 14, the first suction arm 118 comprises a first segment 130 and a second segment 131. The first segment 130 of the first suction arm 118 is mounted so that it can rotate around a first axis A1', which is perpendicular to the longitudinal center plane L. The first segment 130 of the first suction arm 118 comprises a section to which the second segment 131 is attached in such a way that that it can rotate around a non-stationary second axis A2", which is substantially perpendicular to the first axis A1'. A suction device 134 for drawing up and holding the blister pack 4 is arranged on the second segment 131.

The second suction arm 119 also comprises a first segment 132 and a second segment 133. The first segment 132 of the second suction arm 119 is mounted so that it can rotate around the same first axis A1'. The first segment 132 of the second suction arm 119 also comprises a section to which the second segment 133 is attached in such a way that it can rotate around another non-stationary second axis A2''' substantially perpendicular to the first axis A1'. A suction device 134 for drawing up and holding a blister pack 6 is also arranged on the second segment 133.

The suction arms 118, 119 are configured and actuated in such a way that the movement of the suction arms 118, 119 from the associated picking position to the associated placing position and back is a combined movement, which consists of at least one first rotational movement of the first segment 130, 132 and of the second segment 131, 133 around the first axis A1' and a second rotational movement of the second segment 131, 133 around the associated second axis A2", A2'''.

As can be derived from FIG. 12, the second axis A2" of the first suction arm 118 is arranged in such a way that, during the first rotational movement around the first axis A1', it moves in a first plane E1', which intersects the first intermediate place position 122 or its lateral projection along a first straight line L1'. This first straight line L1' is laterally offset from the center M1' of the first intermediate place position 122. The lateral offset of this first straight line L1' starts from the center M1' of the first intermediate place position 122 and proceeds toward the longitudinal center plane L.

The second axis A2''' of the second suction arm 119 is arranged in such a way that, during the first rotational movement of the second suction arm 119 around the first axis A1', it moves in a second plane E2', which intersects the second intermediate place position 123 or its lateral projection along a second straight line L2', which is laterally offset from the center M2' of the second intermediate place position 123. Here, too, the lateral offset, which starts from the center M2' of the second intermediate place position 123, proceeds toward the longitudinal center plane L.

It can be seen with reference to FIG. 14 that the suction device 134 of each suction arm 118, 119 comprises several suction heads 136, which are attached to the second segment 131, 133 by means of a support arm 138. It is also possible for only one suction head 136 to be present for each suction device 134. When several suction heads 136 are present, it is also possible for several separate support arms 138 to be present to connect the suction heads to the second segment 131, 133. In the embodiment shown here, the support arm 138 is configured as a rake, comprising several fingers 139; a suction head 136 is arranged the tip of each of these fingers. The support arm 138 is preferably attached rigidly to the second segment 131, 133. In the embodiment shown, the fingers 139 of the support arm 138 project at a right angle from a common connecting strut 140. The connecting strut 140 is connected in turn to the second segment 131, 133 by means of a connecting member 142, which is perpendicular to the strut. In the embodiment shown, the connecting member 142 of the support arm 138 is connected perpendicularly to the second segment 131, 133. It is also conceivable that the connecting member 142 and thus the support arm 138 could project at a slant from the second segment 131, 133. In the associated picking position and placing position of the suction arms 118, 119, the connecting member 142 and thus the support arm 138 would then also project downward at a slant. As a result, the angle around which the suction arm 118, 119 in question must travel around the first axis A1' could be reduced.

As can be derived from FIG. 14, the second segment 131, 133 of the first or second suction arm 118, 119, when in the associated picking position, is pivoted inward relative to the longitudinal center plane L. In concrete terms, the section of the second segment 131, 133 to which the support arm 138 is attached is pivoted inward. It can also be seen that, in concrete terms, the second segment 131, 133 of the first or second suction arm 118, 119, namely, the section of the second segment 131, 133 to which the support arm 38 is attached, is pivoted outward relative to the longitudinal center plane L when the suction arm is in the associated placing position.

The details of a possible concrete structure and a drive for the suction arms 118, 119 are identical to those previously described for the suction arms 24, 25.

Figure 13:
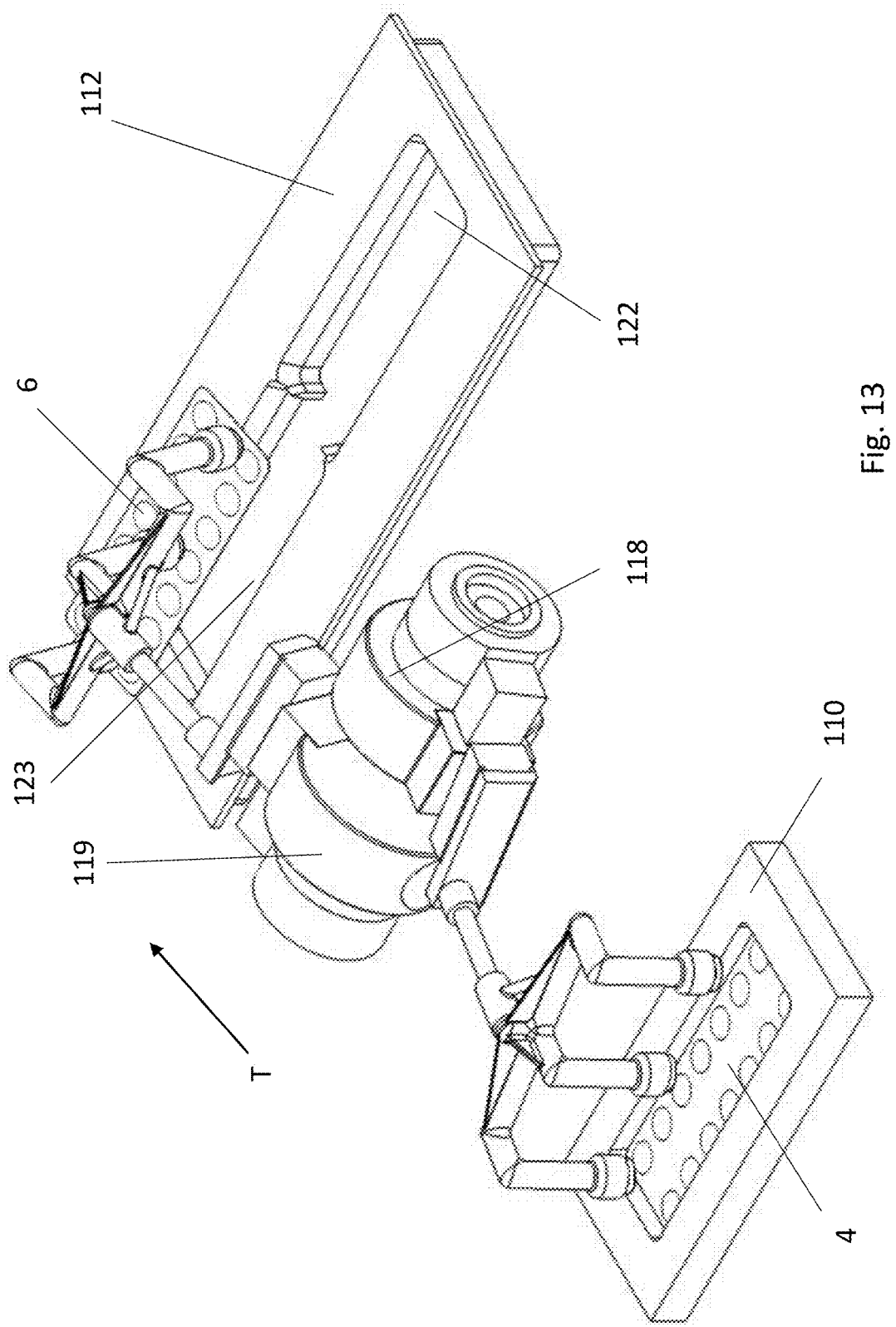
FIG. 13 is a schematic diagram, in perspective, of the transfer unit of FIG. 11 in a different stage of the transfer process.

The sequence of steps of a transfer process as executed by the transfer unit 118 will now be explained in greater detail with reference to FIGS. 11-13. The blister packs 4, 6, when in the ready position 28 in the stamping station 110, are picked one after the other by the first and second suction arms 118, 119 of the first transfer unit 108, moved to the first and second intermediate place positions 122, 123, and placed there.

The first blister pack 4 in the ready position 28 is preferably picked from above and also placed from above in the first intermediate place position 122. When in the ready position 28, the first blister pack 4 is arranged in the area of the longitudinal center axis L and, when in the first intermediate place position 122, it is outwardly offset from the longitudinal center plane L. The first blister pack 4 in the first intermediate place position 122 has the same side facing up as it did when in the ready position 28, but now with a rotation of 180° around its center.

For the transfer of the second blister pack 6 from the ready position 28 to the second intermediate place position 123 by means of the second suction arm 119, what was said above concerning the transfer of the first blister pack 4 by means of the first suction 118 applies here again exactly. The only difference is that the time at which the blister pack 6 is picked and the time at which the blister pack 6 is placed are opposite to those at which the first blister pack 4 is picked and placed. The two suction arms 118, 119 complete a pivoting movement around the same first axis A1', whereas the rotational movements of their second segments 131, 133 around the associated second axes A2", A2"' proceed in opposite rotational directions. At the vertex of the rotational movement, as shown in cross section in FIG. 9, the blister packs 4, 6 are preferably parallel to the longitudinal center plane L.

Figure 11:
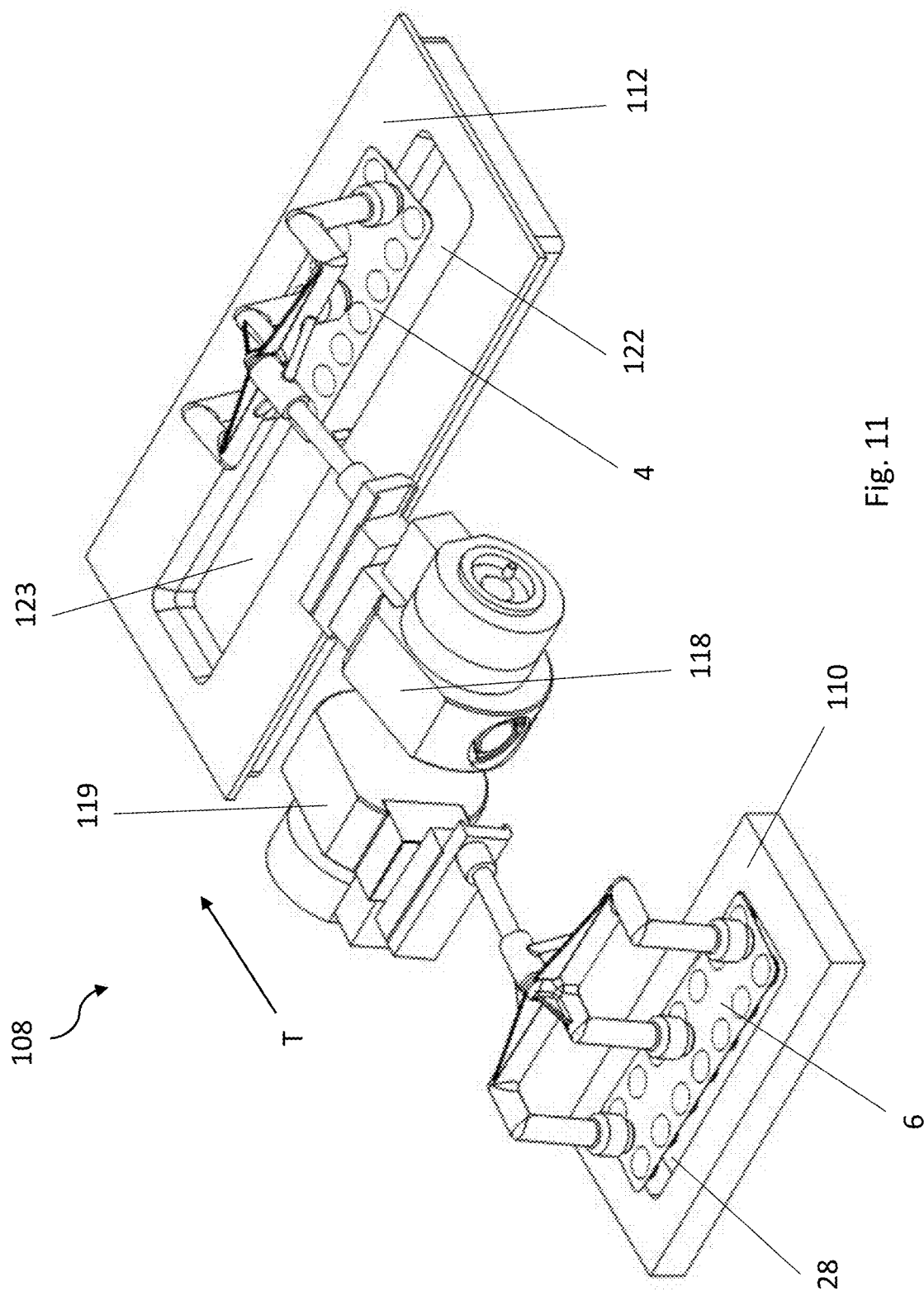
FIG. 11 is a schematic diagram, in perspective, of a variant of a first transfer unit, which can be used in the device according to FIG. 1.

When the first transfer unit 108 according to FIG. 11 is used together with the second transfer unit 14, care must be taken to ensure that, when the two transfer units 108, 14 are actuated, the suction arms 118, 119, 24, 25 located in the area of the intermediate place positions 122, 123 at a particular time are acting on different intermediate place positions 122, 123 (FIG. 12). In the diagram of FIG. 12, therefore, the first suction arm 118 of the first transfer unit 108 and the first suction arm 24 of the second transfer unit 14 are preferably moved synchronously with respect to each other, while the second suction arm 119 of the first transfer unit 108 and the second suction arm 25 of the second transfer unit 14 are also moved synchronously with respect to each other.

The blister packs 4, 6 in the ready position 28 are preferably picked from above. It is also possible, under certain circumstances, that the blister packs 4, 6 in the ready position 28 could be oriented vertically or at an angle to the vertical instead of horizontally. In this case, the suction arms 118, 119 would only have to pivot around the first axis A1' by an angle of less than 180°, usually by an angle in the range of 60-180°. The ratio between the bevel gears 156, 160 is then to be adapted accordingly to ensure that, during this reduced pivoting movement, the second segment 131, 133 executes a complete 180° rotation around the second axis A2", A2"'.

When in the ready positions, the blister packs 4, 6 are, in general, preferably held in place by means of suitable retainers until they have been gripped by the suction arms. The retainers must release the blister packs at the proper time prior to the transfer movement.

The blister packs 4, 6 usually contain tablets, capsules, or sugar-coated pills. The blister packs 4, 6 are usually sealed with a flat lidding foil, upon which the suction heads 36 can act. It is also conceivable, however, that the blister packs 4, 6 could remain open at the top. This is possible especially in cases where the items being packaged are not tablets but rather other medical products such as syringes, ampoules, vials, or the like. In the case of a blister pack 4, 6 without a lidding foil, it is advantageous for the suction heads 36 to be adapted to the shape of the product and to act directly on the products held in the blister pockets. The blister packs 4, 6 can also contain nonmedical products.

The invention claimed is:

1. A device for transferring blister packs comprising
   a first transfer unit for transferring the blister packs to an intermediate place element; and
   a second transfer unit for transferring the blister packs from the intermediate place element,
   wherein the second transfer unit comprises a first suction arm, which is movable between a first picking position, in which the first suction arm picks a first blister pack from a first intermediate place position on the intermediate place element, and a first placing position, in which the first suction arm places the first blister pack in a final place position;
   wherein the second transfer unit comprises a second suction arm, which is movable between a second picking position, in which the second suction arm picks a second blister pack from a second intermediate place position on the intermediate place element, and a second placing position, in which the second suction arm places the second blister pack in the same final place position;
   wherein the first and second suction arms are arranged on either side of a longitudinal center plane of the device;
   wherein each of the first and second suction arms comprises a first segment and a second segment, wherein the first segment of each of the first and second suction arms is mounted rotatably around an associated first axis, which is perpendicular to the longitudinal center plane;
   wherein the first segment of each of the first and second suction arms comprises a section to which the second segment is attached rotatably around a non-stationary second axis, which is substantially perpendicular to the first axis, wherein a suction device for picking and holding a blister pack is arranged on the second segment;
   wherein the first and second suction arms are configured and actuated such that a movement of one of the first and second suction arms from the first or second picking position to the first or second placing position and back is a combined movement, which comprises at least a first rotational movement of the first segment and of the second segment around the first axis and a second rotational movement of the second segment around the second axis;

wherein the first and second suction arms are configured and actuated such that the blister packs in the first and second intermediate place positions are picked from above by the suction devices of the first and second suction arms and are also placed from above in the final place position;

wherein the first and second intermediate place positions are outwardly offset from the longitudinal center plane, and the final place position is arranged in an area of the longitudinal center plane;

wherein the second axis of the first suction arm is arranged such that, during the first rotational movement of the first segment of the first suction arm, the second axis of the first suction arm moves in a first plane, which intersects the intermediate place position or a lateral projection thereof along a first straight line, which is laterally offset from a center of the first intermediate place position; and wherein the second axis of the second suction arm is arranged such that, during the first rotational movement of the first segment of the second suction arm, the second axis of the second suction arm moves in a second plane, which intersects the second intermediate place position or a lateral projection thereof along a second straight line, which is laterally offset from a center of the second intermediate place position.

2. The device of claim 1, wherein, when in the first or second picking position, the second segment of the first or second suction arm is outwardly pivoted from the longitudinal center plane, and wherein, when in the first or second placing position, the second segment of the first or second suction arm is inwardly pivoted from the longitudinal center plane.

3. The device of claim 1, wherein the first and second suction arms are actuated such that the first and second suction arms execute opposite back-and-forth pivoting movements.

4. The device of claim 1, wherein the second segment and thus the blister pack held on the suction device of the first and second suction arms executes a rotational movement of substantially 180° around the second axis when one of the first and second suction arms moves from the first or second picking position to the first or second placing position or vice versa.

5. The device of claim 1, wherein the first segment executes a rotational movement of 120-180° around the first axis when one of the first and second suction arms moves from the first or second picking position to the first or second placing position or vice versa.

6. The device of claim 1, wherein the suction device of each of the first and second suction arms comprises at least one suction head, which is attached to the second segment by means of at least one support arm.

7. The device of claim 6, wherein the at least one support arm is rigidly attached to the second segment.

8. The device of claim 6, wherein, when in the first or second picking position or in the first or second placing position, the at least one support arm projects downward at a slant from the second segment.

9. A method for transferring blister packs to an intermediate place element and from the intermediate place element by means of a device, comprising the steps of:

transferring a first and a second blister pack to the intermediate place element, wherein the first and second blister packs are placed on the intermediate place element next to each other in a row in a first and a second intermediate place position on either side of a longitudinal center plane of the device;

picking a first blister pack from the first intermediate place position of the intermediate place element, moving the first blister pack, and placing the first blister pack in a final place position; wherein the first blister pack in the first intermediate place position is picked from above and is also placed from above in the final place position; wherein the first blister pack, when in the first intermediate place position, is outwardly offset from the longitudinal center plane and is placed in the final place position in an area of the longitudinal center plane; and wherein, after the first blister pack has been placed in the final place position, the first blister pack has the same side facing up as in the first intermediate place position, but now rotated by 180° around a center of the first blister pack; and picking a second blister pack from the second intermediate place position of the intermediate place element, moving the second blister pack, and placing the second blister pack in the final place position; wherein the second blister pack in the second intermediate place position is picked from above and is also placed from above in the final place position; wherein the second blister pack in the second intermediate place position is outwardly offset from the longitudinal center plane and is placed in the final place position in an area of the longitudinal center plane; and wherein, after the second blister pack has been placed in the final place position, the second blister pack has the same side facing up as in the second intermediate place position, but now rotated by 180° around a center of the second blister pack.

10. The method of claim 9, wherein the picking of the first and second blister packs from the intermediate place element, the moving, and the placing is carried out by means of first and second suction arms, which execute opposite back-and-forth pivoting movements.

11. The method of claim 9, wherein transferring the first and second blister packs to the intermediate place element comprises the steps of:

picking the first blister pack from a first ready position; moving the first blister pack; and placing the first blister pack in the first intermediate place position on the intermediate place element; wherein the first blister pack is placed from above in the first intermediate place position of the intermediate place element; and picking the second blister pack from a second ready position; moving the second blister pack; and placing the second blister pack in the second intermediate place position of the intermediate place element, wherein the second blister pack is placed from above in the second intermediate place position of the intermediate place element.

12. The method of claim 11, wherein the first and second blister packs in the first and second ready positions are arranged in a row on either side of the longitudinal center plane; and wherein the first and second blister packs are placed in the first and second intermediate place positions after a rotation of 180° around their centers in comparison to their orientation in the first and second ready positions.

13. The method of claim 11, wherein the first and second blister packs are transferred simultaneously to the intermediate place element.

14. The method of claim 9, wherein the transfer of the first and second blister packs to the intermediate place element comprises the steps of:

picking the first blister pack from a ready position; moving the first blister pack; and placing the first blister pack in the first intermediate place position of the intermediate place element; wherein the first blister pack is placed from above in the first intermediate place position of the intermediate place element; wherein the first blister pack in the ready position is arranged in an area of the longitudinal center plane and is placed in the first intermediate place position with an outward offset from the longitudinal center plane; and wherein the first blister pack is placed in the first intermediate place position after a rotation of 180° around a center of the first blister pack in comparison to an orientation of the first blister pack in the ready position; and picking a second blister pack from the same ready position; moving the second blister pack; and placing the second blister pack in the second intermediate place position of the intermediate place element; wherein the second blister pack in the ready position is picked from above and is also placed from above in the second intermediate place position of the intermediate place element; wherein the second blister pack in the ready position is arranged in an area of the longitudinal center axis and is placed in the second intermediate place position with an outward offset from the longitudinal center plane; and wherein the second blister pack is placed in the second intermediate place position after a rotation of 180° around a center of the second blister pack in comparison to an orientation of the second blister pack in the ready position.

* * * * *